Sept. 5, 1933.     E. L. MASTERS     1,925,809
FERTILIZER SPREADER
Filed May 31, 1930
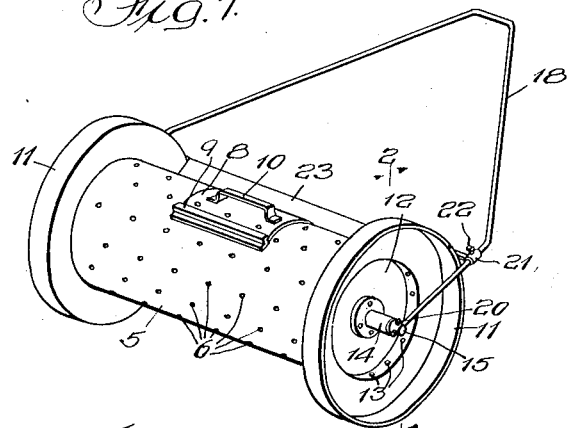
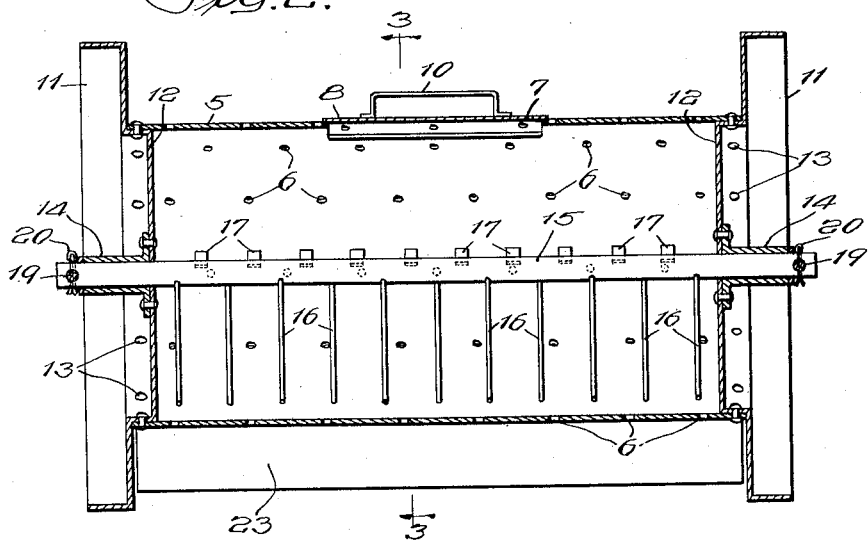
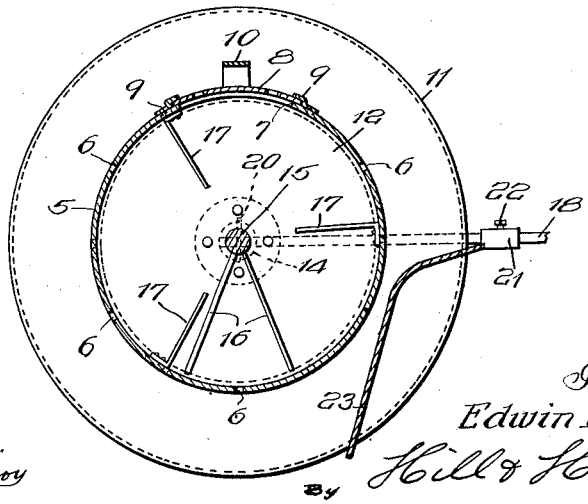
Witness:
William P. Kilroy
Inventor:
Edwin L. Masters
By Hill & Hill
Attys.

Patented Sept. 5, 1933

1,925,809

UNITED STATES PATENT OFFICE 1,925,809

FERTILIZER SPREADER

Edwin L. Masters, Chicago, Ill.

Application May 31, 1930. Serial No. 457,684

3 Claims. (Cl. 275—2)

This invention relates to fertilizer spreaders, and particularly to a device of the character described which is light and durable, and which may be hand operated.

The structure of the present invention is particularly adapted for spreading or distributing fertilizer which is in finely divided, powdered or granulated form.

One object of the present invention is to provide a spreader which is light, durable and capable of being operated by hand for the distribution of a powdered fertilizer on lawns, golf courses, parks and the like.

Another object of the invention is to provide a device by which substantially even distribution of the fertilizer may be obtained.

Another object of the invention is to provide suitable means for shielding the fertilizer from the broadcasting effect of wind currents, and to insure substantially uniform distribution of the material on the ground.

A further object of the invention is to provide means for breaking up any lumps or oversize pieces of the fertilizer material which might form, thereby insuring efficient operation of the device.

A still further object of the invention is to improve devices of the character disclosed in sundry details hereinafter described and particularly pointed out in the appended claims.

One embodiment of the present invention is shown for illustrative purposes in the accompanying drawing in which Fig. 1 is a perspective view of a fertilizer spreader embodying features of the present invention;

Fig. 2 is a longitudinal sectional elevation taken substantially as indicated by the line 2—2 of Fig. 1; and Fig. 3 is a transverse sectional view taken substantially as indicated by the line 3—3 of Fig. 2.

As shown in the illustrative embodiment, the present invention comprises a tubular container member 5 of substantially cylindrical form for receiving a fertilizer material, said member being provided with a plurality of spaced radially disposed perforations 6 and a filler opening 7, the opening 7 being provided with a closure 8 slidably mounted in guide members 9 secured to the tubular member 5, said closure having a handle or grip 10 secured thereto by which it may be moved in the guides 9 longitudinally of the tubular member 5 in a manner to cover and uncover the filler opening 7.

Positioned adjacent the opposite ends of the member 5 are supporting or transporting members 11 preferably of substantially disc-like annular form, each of the members 11, in the present instance, being provided on their adjacent faces with bosses 12 disposed preferably adjacent and concentric with the central portion of the supporting members, and adapted to be positioned within the ends of the container member 5 in a manner to be secured thereto by means of bolts or rivets 13, and to provide end walls for the container member.

Secured preferably to the outer or oppositely disposed sides of the bosses 12 preferably adjacent the central portion thereof and concentric therewith are hub members 14, in which is mounted a bar 15 in a manner to permit rotation of the hub members 14, transporting members 11 and member 5 thereon.

The bar 15 is adapted to extend longitudinally of the tubular member 5, and is provided, intermediate its end portions and between the adjacent faces of the bosses 12, with a plurality of longitudinally spaced radially extending fingers 16 adapted to engage and break up any lumps or over-size pieces of fertilizer material to facilitate its passage through the apertures 6.

To assist in more completely and effectually breaking up any lumps or over-size pieces of fertilizer material, a plurality of agitator blades 17 may be secured to the inner face of the member 5 in a manner to maintain a substantially uniform distribution of the fertilizer material throughout the length of the container, and to cooperate with the fingers 16 for insuring the reduction in size of any lumpy material sufficiently to permit its passage through the apertures 6 of the container.

For operating or moving the spreader over the ground as desired, a draft member 18 is provided, and shown, in the present structure, as of bail-like form having its opposite ends positioned in apertures 19 extending transversely through the bar 15 adjacent the ends thereof, and secured thereto by means of cotter pins 20 extending through the end portions of the bar and draft member, as clearly shown in Fig. 2.

Suitably mounted on the draft member 18 by means of sleeves 21 and set screws 22 is a windshield or apron 23 adapted to be positioned between the transporting members 11 and adjacent the container member 5, and to extend downwardly a suitable distance toward the ground in a manner to shield the fertilizer material from wind or air currents as the material issues from the apertures 6 and is being deposited on the ground. The apron 23 may be adjusted with respect to the member 5 and be secured in adjusted position by means of the set screws 22. If desired, the apron may be provided with suitable means for varying the position of its lower edge portion with respect to the ground.

It will be observed that by the arrangement described, the cylindrical member 5 is positioned in spaced relation with respect to the surface of the ground by means of the transporting members 11, and that the device may be operated by means of the draft member 17 in a manner to cause the member 5 to be rotated about the bar 15 to agitate the fertilizer material within the container in a manner to permit it to sift through the apertures 6 formed in the member 5. It will be noted also, that by the arrangement shown, the fingers 16 are relatively stationary with respect to the container 5, and that any lumps or over-size pieces of fertilizer material therein will be brought into contact with the fingers by the blades 17 and broken up in a manner to facilitate their passage through the apertures.

It will be understood that the present device may be operated by hand or the draft member 18 may be provided with a suitable fitting (not shown) by which it may be connected to a lawn mower or other vehicle by which it may be drawn and the fertilizer spread over the ground with substantially uniform distribution.

Obviously, the present invention is not limited to the precise construction and arrangement shown and described, as the same may be variously modified. Moreover, all the features of the present invention need not be used conjointly as the same may be used to advantage in variously different combinations and sub-combinations.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A device of the class described comprising a tubular member having a plurality of perforations formed therein, transporting members having bosses formed on their adjacent sides and secured to opposite ends of said tubular member, a bar mounted in said bosses and extending longitudinally of and within said tubular member, a plurality of fingers mounted on said bar in spaced relation longitudinally thereof, and a draft member secured to opposite ends of said bar.

2. A device of the class described comprising a cylindrical tubular member having a plurality of radially disposed perforations formed therein, annular transporting members having centrally disposed annular bosses formed on their adjacent sides and positioned in the ends of said tubular member and secured thereto in a manner to form end portions for said tubular member, a bar mounted in and positioned substantially centrally of said bosses, said bar extending longitudinally of and within said tubular member, a plurality of radially extending fingers mounted on said bar in spaced relation longitudinally thereof, and a draft member secured to opposite ends of said bar.

3. A fertilizer spreader comprising a container for receiving a fertilizer material and having a plurality of perforations formed therein, transporting members operatively related thereto for rotating the container, means within said container for breaking up over-size pieces of fertilizer material to facilitate its passage through said perforations, a draft member operatively related to said transporting members, and a windshield between said transporting members and adjustably mounted on said draft member in a manner to vary the position of the shield with respect to said container.

EDWIN L. MASTERS.